United States Patent
Arvag

(10) Patent No.: US 9,579,941 B2
(45) Date of Patent: Feb. 28, 2017

(54) ATTACHMENT SYSTEM FOR ATTACHING AN EXTERNAL COMPONENT TO A CHASSIS OF A VEHICLE

(71) Applicant: AARVAG'S BARGNING & MEK AB, Ostersund (SE)

(72) Inventor: Iver Arvag, Ostersund (SE)

(73) Assignee: AARVAG'S BARGNING & MEK AB, Ostersund (SE)

( * ) Notice: Subject to any disclaimer, the term of this patent is extended or adjusted under 35 U.S.C. 154(b) by 0 days.

(21) Appl. No.: 14/759,582

(22) PCT Filed: Feb. 6, 2014

(86) PCT No.: PCT/SE2014/050150
§ 371 (c)(1),
(2) Date: Jul. 7, 2015

(87) PCT Pub. No.: WO2014/123479
PCT Pub. Date: Aug. 14, 2014

(65) Prior Publication Data
US 2015/0352914 A1 Dec. 10, 2015

(30) Foreign Application Priority Data

Feb. 8, 2013 (SE) ........................ 1350151

(51) Int. Cl.
*B60D 1/48* (2006.01)
*B60D 1/07* (2006.01)
(Continued)

(52) U.S. Cl.
CPC .............. *B60D 1/485* (2013.01); *B60D 1/07* (2013.01); *B60D 1/565* (2013.01); *B60P 3/12* (2013.01); *B60P 3/125* (2013.01)

(58) Field of Classification Search
CPC .......... B60D 1/485; B60D 1/07; B60D 1/565; B60P 3/12; B60P 3/125
(Continued)

(56) References Cited

U.S. PATENT DOCUMENTS 2,089,400 A   8/1937  Morris
3,848,894 A * 11/1974 Breford .............. B62D 53/0828
                                                        280/437

(Continued)

FOREIGN PATENT DOCUMENTS

DE    10 2005 056 578 A1   6/2007
FR         1159406         6/1958

(Continued)

OTHER PUBLICATIONS

International Search Report prepared by the European Patent Office on Jun. 20, 2014, for International Application No. PCT/SE2014/05050.

(Continued)

*Primary Examiner* — Jacob Knutson
(74) *Attorney, Agent, or Firm* — Sheridan Ross PC

(57) ABSTRACT

The invention concerns an attachment arrangement for attaching an external component to a chassis of a vehicle, such as a salvaging device for use when performing salvaging work and transport of heavy duty vehicles. The attachment arrangement comprises at least one elongated mounting device, where each mounting device comprises a first fastening element arranged to provide a rigid connection with a corresponding connection means in the chassis, and a second fastening element for connecting the external component. Further, a support element is arranged between the first fastening element and said second fastening ele- (Continued)

ment. The support element is arranged to bear against the chassis when the first fastening element is connected to the chassis.

10 Claims, 5 Drawing Sheets

(51) Int. Cl.
   *B60D 1/56* (2006.01)
   *B60P 3/12* (2006.01)
(58) Field of Classification Search
   USPC .................................................. 280/495, 504
   See application file for complete search history.

(56) References Cited

U.S. PATENT DOCUMENTS

| | | | |
|---|---|---|---|
| 4,577,883 A * | 3/1986 | Duncan | B60D 1/54 280/491.4 |
| 4,869,521 A * | 9/1989 | Johnson | B60D 1/54 280/491.1 |
| 5,064,078 A * | 11/1991 | Van Staveren | B60P 1/548 212/180 |
| 6,685,212 B1 * | 2/2004 | Penlerick | B60D 1/143 280/477 |
| 6,971,662 B2 * | 12/2005 | Frischkorn | B60D 1/565 280/491.1 |
| 7,077,417 B2 * | 7/2006 | Shoemaker | B60D 1/52 280/504 |
| 2007/0024027 A1 | 2/2007 | Pratt et al. | |
| 2012/0292930 A1 | 11/2012 | Hermanson et al. | |

FOREIGN PATENT DOCUMENTS

| | | |
|---|---|---|
| FR | 2 894 554 | 6/2007 |
| JP | 2002 053066 A | 2/2002 |
| JP | 2002053066 A * | 2/2002 |

OTHER PUBLICATIONS

Written Opinion prepared by the European Patent Office on Jun. 20, 2014, for International Application No. PCT/SE2014/05050.

* cited by examiner

ATTACHMENT SYSTEM FOR ATTACHING AN EXTERNAL COMPONENT TO A CHASSIS OF A VEHICLE

CROSS REFERENCE TO RELATED APPLICATION

This application is a national stage application under 35 U.S.C. 371 of PCT Application No. PCT/SE2014/050150 having an international filing date of Feb. 6, 2014, which designated the United States, which PCT application claimed the benefit of Swedish Application Serial No. 1350151-5, filed Feb. 8, 2013, both of which are incorporated by reference in their entirety.

FIELD OF THE INVENTION

The present invention relates to an attachment arrangement for attaching an external component to a chassis of a vehicle.

BACKGROUND OF THE INVENTION

Various attachment arrangements for salvaging work and transport of vehicles, such as heavy vehicles, are known. An example of a known attachment arrangement is schematically illustrated in FIG. 1, which shows a perspective front view of a traditional heavy duty truck 10 in which a salvaging device 12 is secured to a front chassis frame of the truck. The salvaging device 12 consists of a lifting belt 18, which is secured to an attachment arrangement consisting of a couple of tow rings 16 which are engaged by means of a respective screw joint formed with receiving connection means in the chassis frame (not visible in FIG. 1). The tow rings 16 project through a bumper 14 of the vehicle, to provide points of attachments for the lifting belt, or alternatively for an elevating chain, which accordingly interconnect the two tow rings 16. An interconnecting linkage 20 is arranged at mid section of the lifting belt 18 in order to provide a terminal post for a hook 22. The hook 22 is suspended from a lifting device 23, or a towing device, for salvaging, lifting or towing of the truck 10.

Salvaging of heavy duty vehicles puts stiff demand on the used towing gear and method of procedure during the salvaging work, as incorrect salvaging can cause an even greater damage on the vehicle as compared to any damage present before the salvaging work is started. For extremely heavy vehicles, so called heavy duty wrecker trucks are used for salvaging work. Wrecker trucks are equipped with lifting jacks with a capacity of over 30 tons. In addition these trucks are often equipped with a lifting beam for towing/hauling wrecked or defect vehicles to a garage or to a scrap yard, where the lifting beam has a capacity of over 20 tons. This kind of equipment allows the wrecker truck to perform salvaging work on both busses and transport lorries. The salvaging work comprises performing lifting and/or hauling/towing work on the vehicle. The salvaging work is many times performed while applying highly asymmetrical forces on the connection means of the vehicle being salvaged, and consequently on the chassis frame of the vehicle being salvaged.

DISCLOSURE OF INVENTION

One object of the invention is to provide an improved attachment arrangement/device which is arranged to in a simple and safe manner be mountable to a vehicle chassis and to attach to an external component of a vehicle, such as a salvaging device, and which attachment arrangement is arranged to distribute asymmetric forces acting on the chassis of the vehicle and thereby decrease the risk of damaging the chassis frame of the vehicle during salvaging work. This object is achieved by the attachment arrangement according to the independent claim 1.

In accordance with a first aspect of the invention, an attachment arrangement is provided for attaching an external component to a chassis of a vehicle. The attachment arrangement comprises at least one elongated mounting device comprising a first fastening element arranged to provide a rigid connection with a corresponding connection means in the chassis, and a second fastening element for connecting with the external component. Further, a support element is arranged on the mounting device, between the first fastening element and the second fastening element. The support element is arranged to bear against the chassis when the first fastening element is connected to the chassis.

An attachment arrangement is thereby achieved which has one or more mounting devices, the latter which herein after also are referred to as pull studs. The attachment arrangement has a support element which in a mounted state of the pull stud is arranged to bear against the chassis of the vehicle, and which therefore counteracts any loosening between the pull stud and the connecting means of the chassis. This reduces wear on the connecting means and the pull stud due to loose. In accordance with the shown embodiment of the invention, the support element is defined by a circumferential protrusion, a ring shaped flange, which is arranged at the first fastening element, and between the first fastening element and the second fastening element. The ring shaped flange is arranged having a larger diameter than the first fastening element and the opening of the receiving connecting means of the chassis, such that a circular radially outwards directed bearing surface between the support element and chassis frame with respect to and along the opening of the receiving connecting means of the chassis frame is provided. This is advantageous when performing an asymmetric salvaging operation to distribute forces acting on the pull stud in a radial direction.

Preferably the first fastening element is complementary shaped with respect to the receiving connection means of the chassis frame. The receiving connection means of the chassis frame are herein after referred to as the chassis connector element. The first fastening element of the pull stud is in the embodiments presented in this application adapted to connect to an existing type of chassis connector element according to Volvo-truck models with year of construction 2013 and on. This by means of the first fastening element having a partly conical shape and an outer threading adapted to be mounted in a Volvo 2013 chassis connector element, or other models of vehicles having the same type of chassis connector element.

According to an embodiment of the attachment arrangement, the first fastening element comprises a threaded end portion arranged for connecting to a corresponding at least partly on an inside threaded receiving opening in the connecting means of the chassis frame.

According to an embodiment of the attachment arrangement, the first fastening element comprises a guiding portion. The guiding portion preferably comprises a cone-shaped cylinder portion, which facilitates mounting of the pull stud as the guiding portion during mounting of the pull stud guides the pull stud into a proper position.

According to an embodiment of the attachment arrangement, the pull stud, further comprises a spacing portion arranged between the second fastening element and the support element for providing a predetermined space between said chassis and said external component, which is advantageous because this provides a necessary clearance between the vehicle bumper and external components which prevents any damaging of the vehicle plastic details, for example when performing hauling/towing of the vehicle.

According to an embodiment of the attachment arrangement, the second fastening element comprises a ring shaped connector element for connecting the external component to the pull stud. The connector element is according to an embodiment of the attachment arrangement detachably arranged on the pull stud, and according to an embodiment of the attachment arrangement, the connector element comprises a locking element arranged for fixation of the connector element to the body of the pull stud.

According to an embodiment of the attachment arrangement it comprises two pull studs and a horizontally elongated crossbar, the latter which is arranged for interconnecting the two pull studs. In this manner an enforcement of the attachment arrangement is achieved. Forces acting on the pull studs are more evenly distributed when performing asymmetric salvaging work. As an example of an asymmetric salvaging work consider a vehicle laying in a ditch, where the vehicle may even be at least partly tipped over, and which is to be pulled out of the ditch back onto the roadway again. As the towing belt is pulled the traction force acting on the pull studs is distributed over the chassis frame and in this manner twisting of the vehicle chassis frame is counteracted. Typically, during asymmetric salvaging work, twisting of the vehicle chassis frame often causes damaging of the vehicle. Also a more even distribution of the forces increases the safety during salvaging work.

The crossbar is according to an embodiment of the attachment arrangement detachably arranged. That is, it can be mounted and demounted from the pull studs, which is advantageous for example by facilitating mounting of the attachment arrangement.

According to an embodiment of the attachment arrangement, the crossbar is connected to the pull studs by means of said connector element.

According to an embodiment of the attachment arrangement, the external component is one of a salvaging means, a snow plough, support element for a crane, a measuring gear, and a road surface marking assembly.

According to an embodiment of the attachment arrangement, it further comprises at least a second connector element for connecting to a second external component. According to a preferred embodiment the external component of the vehicle is a salvaging device. In this embodiment, it is advantageous to arrange the connector element is adapted to connect to different types of salvaging devices. For example, in one embodiment, the connector element of the second fastening element is adapted for connecting a towing/lifting belt, while the second connector element is arranged on the crossbar and is adapted for connection to a lifting beam for hauling/towing of the vehicle. Both of these types of salvaging devices are commonly used on wrecker trucks. Hauling transport usually takes place after pulling/lifting the truck being salvaged onto the roadway. Alternatively, the connector elements are themselves arranged for connection to different types of external components.

BRIEF DESCRIPTION OF THE DRAWINGS

This and other aspects of the present invention will now be described in more detail, with reference to the appended drawings showing non limiting embodiment(s) of the invention. Corresponding components in the embodiments have the same reference number.

DETAILED DESCRIPTION

The present invention is exemplified herein under with an embodiment of an attachment arrangement for attaching an external component to a chassis of a heavy duty vehicle. The term salvaging means should be understood as equipment for salvaging/pulling up vehicles from ditches or from being stuck in mud or snow, and for transporting damaged/defect vehicles to a garage. It is understood however that the attachment arrangement according to the present invention is applicable for securing other types of external components such as a snow plough, support element for a crane, a measuring gear, and a road surface marking assembly etc.

Figure 1:
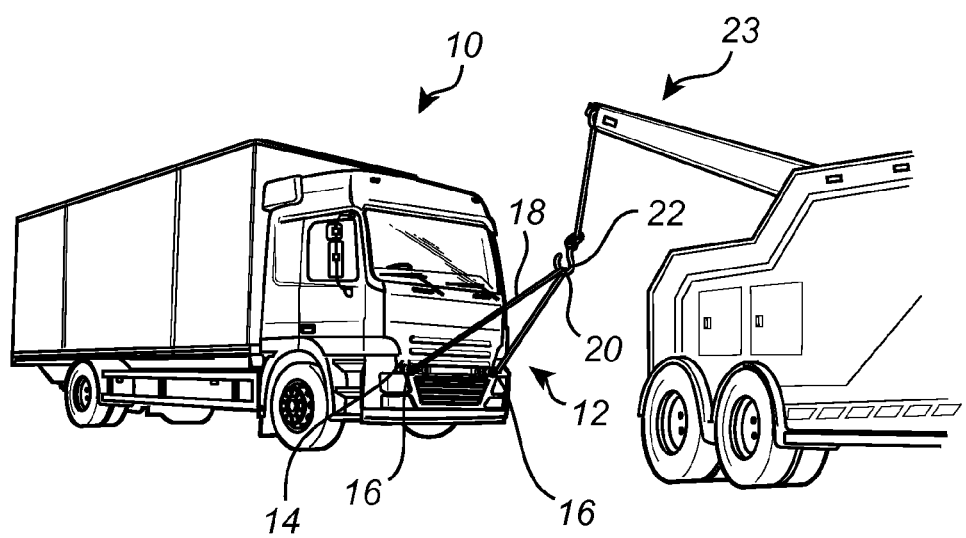
FIG. 1 is a schematic perspective view of a prior art attachment arrangement which is used for salvaging work like towing or lifting of a truck.
Figure 2:
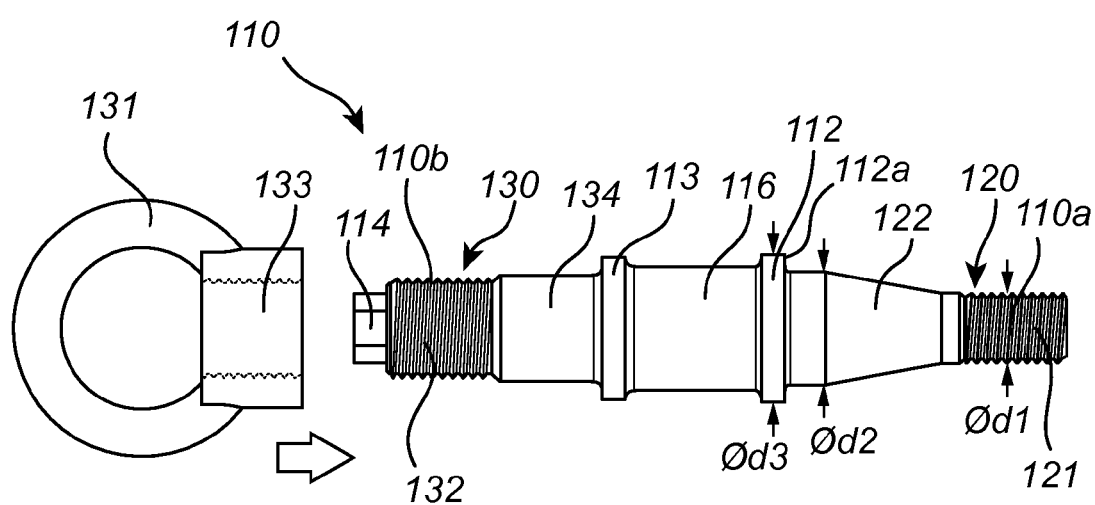
FIG. 2 is a schematic side view of an embodiment of an attachment arrangement according to the present invention.

FIG. 2 is a side view of a mounting element, pull stud 110, according to an embodiment of the attachment arrangement of the present invention. The pull stud 110 comprises a longitudinally elongated, substantially cylinder shaped body, which is manufactured from heavy duty metal material such as toughened steel. The pull stud 110 comprises a first fastening element 120 arranged at a first end portion 110a of the pull stud 110. The first fastening element 120 is arranged for providing a rigid connection with a corresponding connection means in a chassis frame to which the attaching device is connected during mounting. The connection means of the vehicle is herein after referred to as "chassis connector element". In accordance with the shown embodiment in this application, the first fastening element 120 is adapted to be connectable to a chassis connector element of a Volvo-truck model with year of construction 2013. The pull studs first fastening element comprises a cylindrical end portion 121 with an outer threading, the cylindrical end portion having a diameter $d_1$, and a conical guiding portion 122 arranged immediately at and inside of the end portion 121. The guiding portion 122 has a base diameter $d_2$ which is larger than the end portion 121 diameter $d_1$. In alternative embodiments the first fastening element of the pull stud is adapted for fitting to a desired chassis connection element, i.e. the type of chassis connection element that a selected vehicle is equipped with.

The pull stud 110 further comprises a support element 112 which is arranged on an inner position (more central position) with respect to the first fastening element 120, which support element consist of a protruding portion which is arranged having a larger diameter $d_3$ than the guiding portion base diameter $d_2$. The support element 112 is arranged such that a bearing surface 112a of the support element bears against the chassis frame of the vehicle in a mounted position of the pull stud, when the first fastening element is screwed in place in a receiving chassis connection element.

In a second end portion 110b of the pull stud, at the opposite end with respect to the first end portion 110a, a tightening bolt 114, here in the form of a hexagonal head bolt, is arranged. The tightening bolt 114 is intended for application of a torque wrench or the like, which is used to fasten the pull stud 110 to the chassis connector element and to provide follow-up draft on the joint which is formed between the first fastening element 120 and the chassis connector element when mounting the pull stud.

The pull stud 110 further comprises a second fastening element 130 which is arranged at the second end portion 110*b*. The second fastening element 130 is arranged for connecting an external component through a, to the second fastening element 130 corresponding, connector element 131. According to an alternative embodiment, the connector element is integrated with the second fastening element 130 (not shown).

Figure 4:
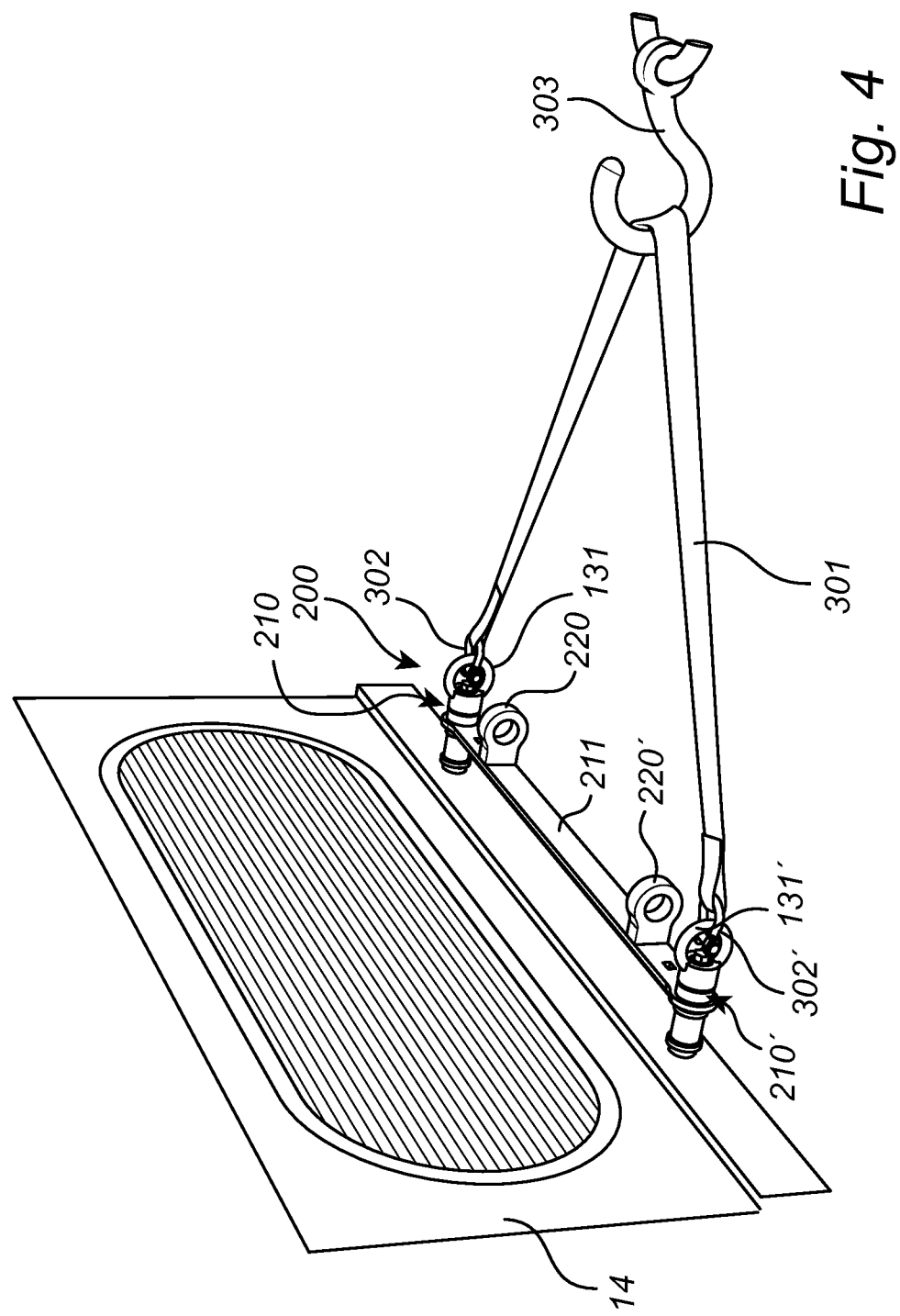

In the exemplifying embodiment, the external component is a salvaging means, such as a towing belt arranged for interconnection with a towing hook, which is illustrated in more detail in FIG. 4. The connector element 131 here comprises a hook (or eye), and further comprises an opening 133 arranged in the hook and having an inner threading, which provides a locking element when connecting the hook to the second fastening element 130 via a threaded portion 132 which is threaded on the outside. The hook fastened to the portion 132 by screwing the locking element, opening 133, onto the threaded portion 132.

The second fastening element 130 further comprises a first spacing portion 134 arranged at an inner position (more central position) with respect to the threaded portion 132, and a stop lug 113 arranged on an inner position (more central position) with respect to the threaded portion 132. The pull stud 110 further comprises a second spacing portion 116 arranged between the stop lug 113 and the support element 112.

Figure 3:
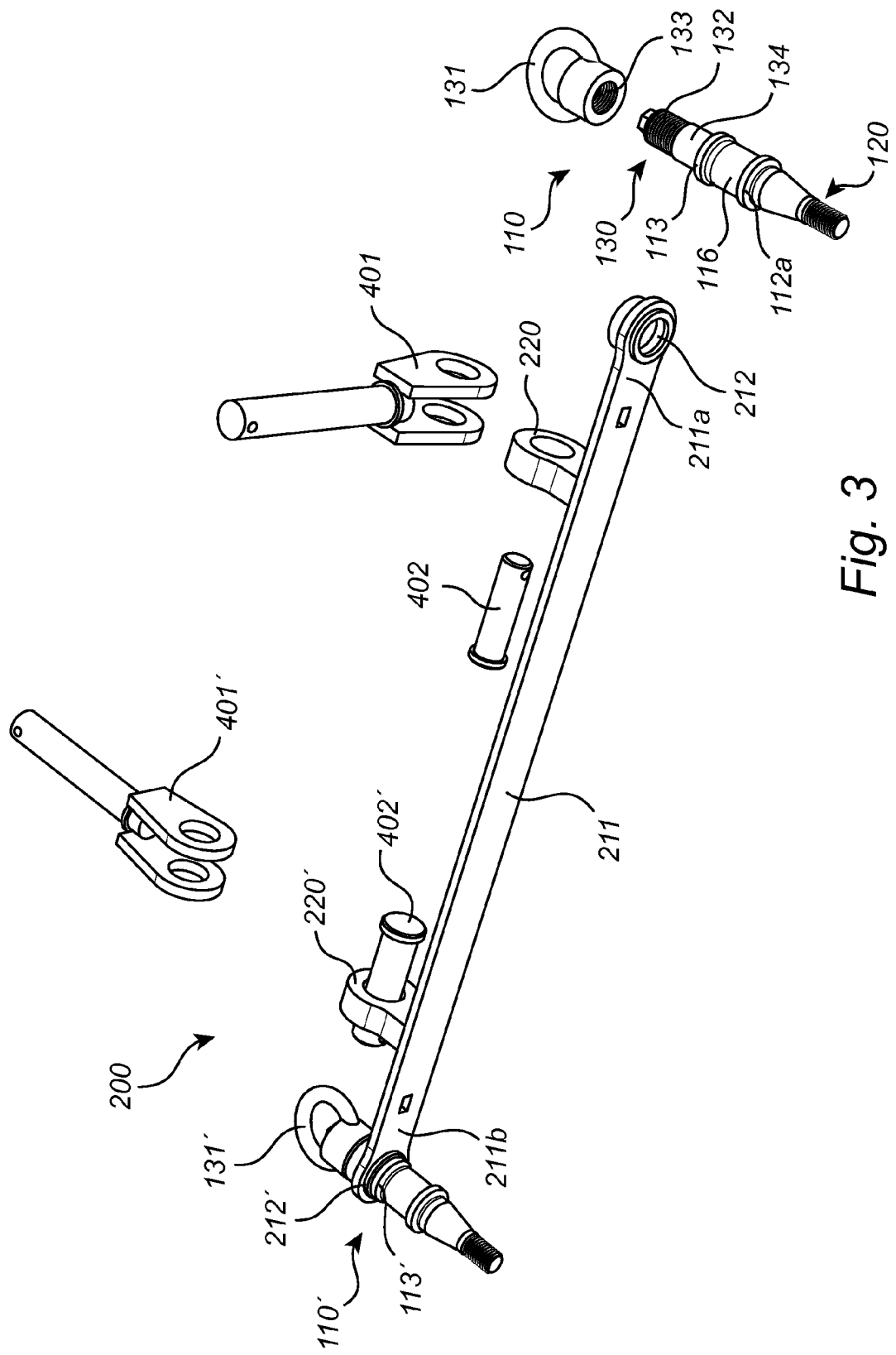
FIG. 3 is a schematic perspective view of an embodiment of an attachment arrangement according to the present invention, and FIG. 4 and FIG. 5 schematically illustrate how two different external components connect to an embodiment of an attachment arrangement according to the present invention.

Referring now to FIG. 3, which shows an embodiment 200 of the attachment arrangement according to the present invention, the attachment arrangement 200 comprises two pull studs (mounting devices) 110 and 110', which are interconnected with a horizontally arranged elongated crossbar 211. In a mounted position the crossbar is arranged in parallel with the chassis frame of the vehicle (typically the front chassis frame of the vehicle). In FIG. 3 one of the pull studs 110 is illustrated in an exploded view. The length of the crossbar 211 is adapted to match the pull studs 110, 110' position when mounted into the chassis connector elements of a vehicle. Two openings 212 and 212' for allowing the pull studs second fastening elements 130 to pass through are arranged in a respective end portion 211*a* and 211*b* of the crossbar. After mounting of the pull studs 110, 110' in to the chassis connector elements of the vehicle, the crossbar openings 212, 212' are slipped over a respective second fastening element 130 such that the crossbar bears against the stop lugs 113, and subsequently, the connector elements 131, 131' are fastened in the respective mounting elements 110, 110' as is described above with reference to FIG. 2. Thereby the crossbar is (detachably) fixated to the attachment arrangement 200.

In the exemplifying embodiment, the crossbar 211 further comprises second connector elements 220, 220' for a second salvaging device. The second salvaging device is in this example a lifting beam, which is a typical salvaging device used for towing/hauling of vehicles. The connector elements 220, 220' are here two, outwards protruding loop shaped elements which are centrally positioned on the crossbar 211 with a mutual distance adapted to fit corresponding connecting elements 401, 401' of the lifting beam, see also lifting beam 400 in FIG. 5. When mounting the lifting beam the connecting element 401, 401' are secured to the attachment arrangement with a respective pin 402, 402'. For more details on how to connect a lifting beam, see FIG. 5.

FIG. 4 is a schematic perspective view of an embodiment of an attachment arrangement 200 according to the present invention, which is also described with reference to FIG. 3. FIG. 4 shows a close-up-view of the front of a vehicle to be salvaged. The attachment arrangement 200 is mounted to the chassis frame of the vehicle (not visible) such that the pull studs 210, 210' are screwed into a respective chassis connector element such that their support surfaces (see support surface 112*a* in FIG. 2) bear against the chassis frame. The pull studs 210, 210' protrude through openings in the vehicle bumper 14. The cross bar 211 is secured by means of the connector elements 131, 131', which here comprise a respective hook (or loop), to which a towing cable 301 is connected. The towing cable 301 is arranged with two locking elements 302, 302', which here consist of lockable rings, so called shackles, which are arranged in a respective end of the towing cable 301 and which are secured in the respective connector elements of the attachment arrangement, that is here hooks 131, 131'. Further, when performing salvaging work on the vehicle, a towing hook 303 is connected to the towing cable 301. The towing hook is connected allowing it to run along the towing cable and the towing cable will thus distribute/even out the applied pulling force between the pull studs 210, 210'.

Figure 5:
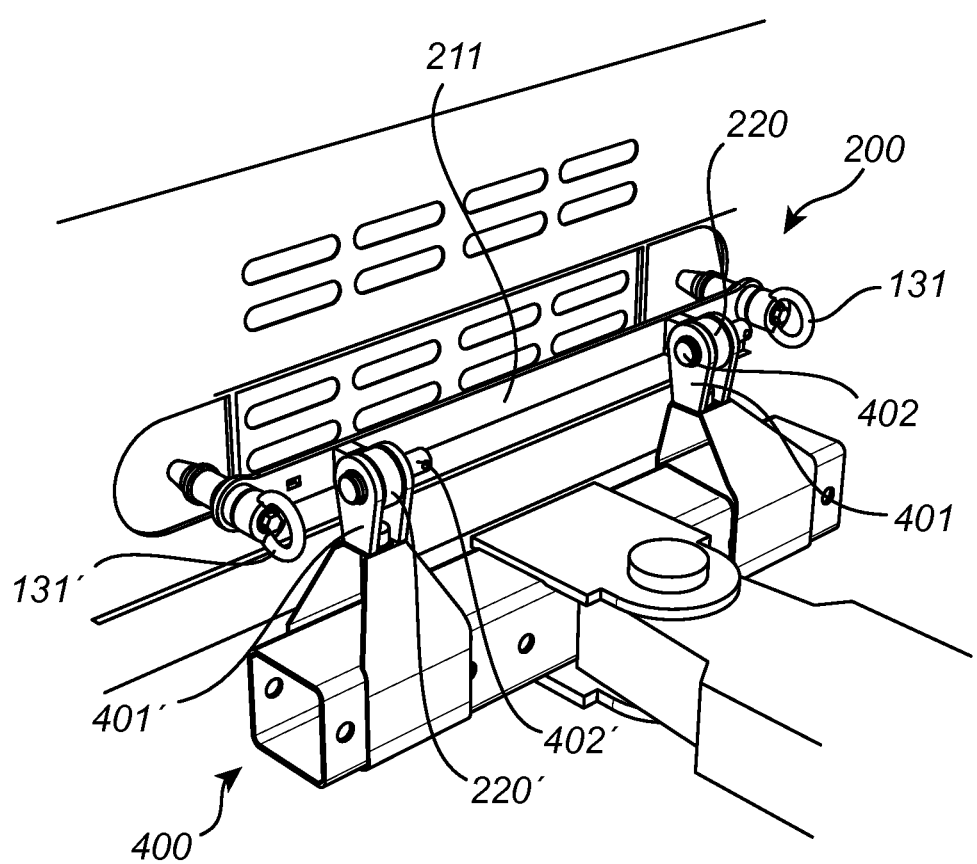

FIG. 5 is a schematic perspective view of a vehicle which is fitted with a similar embodiment of the attachment arrangement 200 as shown in FIG. 4. However, here a lifting beam 400 is connected to the second connector elements 220, 220' of the attachment arrangement 200. The lifting beam 400 is here connected to the attachment arrangement 200 by means of a couple of receiving, U-shaped, connector elements 401, 401', which are arranged for fitting with a respective one of the second connector elements 220, 220' of the attachment arrangement 200. To continue, the lifting beam is secured to the attachment arrangement 200 with a respective pin 402, 402' which runs through corresponding pin openings of the connector elements 401, 401' and through the eye in the connector elements 220, 220' of the attachment arrangement.

The attachment arrangement 200 is mounted to the chassis frame of a vehicle according to the following steps. Initially the pull studs 110, 110' are screwed into the chassis connector elements until the support surfaces 112*a* of the support elements bear against the chassis of the vehicle. The crossbar openings 212 for providing a lead-through for the second fastening elements 130 of the pull studs, are mounted onto a respective second fastening element 130 such that the crossbar 212 bears against a respective stop lug 113. Subsequently, the respective connector element 131 is screwed onto a corresponding threaded portion 132 of the pull studs. A torque wrench or similar tool is applied to the respective tightening bolt 114 to perform follow-up draft of the pull studs 110, 110'. Thereafter, additional follow-up draft of the pull studs may be provided under high torque by means of an iron bar or the like, which is lead through the respective connector element 131. The external component, e.g. a towing cable as illustrated in FIG. 4, is then connected by securing them to the connector elements 131, 131'. Demounting of the salvaging device (external component) and the attachment arrangement is done in a reverse order.

The person skilled in the art realizes that the present invention by no means is limited to the preferred embodi-

What is claimed is:

1. An attachment arrangement for attaching an external component to a chassis of a vehicle comprising:
   two elongated mounting devices, each comprising:
   (a) a first fastening element arranged to provide a rigid connection with a corresponding connection means in said chassis;
   (b) a second fastening element for interconnecting with said external component;
   (c) a support element which is arranged between said first fastening element and said second fastening element, wherein said support element is arranged to bear against said chassis when said first fastening element is connected to said chassis; and
   (d) a detachably arranged connector element; and
   a horizontally arranged elongated crossbar which is arranged to interconnect said two mounting devices;
   wherein said crossbar is fixated to said mounting devices by means of said respective connector element.

2. An arrangement according to claim 1, wherein said first fastening element comprises a threaded end portion arranged for connecting at least partly on an inside threaded receiving opening in said corresponding connecting means.

3. An arrangement according to claim 2, wherein said first fastening element comprises a guiding portion, wherein said guiding portion preferably comprises a cone-shaped cylinder portion.

4. An arrangement according to claim 1, wherein each said mounting device further comprises a spacing portion arranged between said second fastening element and said support element for providing a predetermined space between said chassis and said external component.

5. An arrangement according to claim 1, wherein said connector element for connecting said external component is ring shaped.

6. An arrangement according to claim 1, wherein said connector element comprises a locking element.

7. An arrangement according to claim 1, wherein said crossbar is detachably arranged to said mounting devices.

8. An arrangement according to claim 1, wherein said external component is one of salvaging means, a snow plough, a support element for a crane, a measuring gear or a road surface marking assembly.

9. An arrangement according to claim 8, further comprising at least a second connector element for connecting to a second external component, wherein said second connector element is arranged on said crossbar.

10. An arrangement according to claim 1, wherein each said mounting device further comprises a tightening bolt.

* * * * *